United States Patent [19]

Becker et al.

[11] Patent Number: 4,541,977

[45] Date of Patent: Sep. 17, 1985

[54] METHOD FOR PRODUCING SEPARATING NOZZLE ELEMENTS

[75] Inventors: Erwin Becker, Karlsruhe; Wilhelm Bier, Leopoldshafen; Wolfgang Ehrfeld, Karlsruhe; Dietrich Münchmeyer, Weingarten, all of Fed. Rep. of Germany

[73] Assignee: Kernforschungszentrum Karlsruhe GmbH, Fed. Rep. of Germany

[21] Appl. No.: 470,281

[22] Filed: Feb. 28, 1983

[30] Foreign Application Priority Data

Feb. 26, 1982 [DE] Fed. Rep. of Germany ....... 3206820

[51] Int. Cl.$^4$ .............................................. B29C 1/02
[52] U.S. Cl. ................................... 264/102; 264/219; 264/221; 264/226; 264/227; 264/317; 264/DIG. 48
[58] Field of Search ....... 264/221, 227, 317, DIG. 48, 264/102, 219, 226; 204/11; 425/175, 176

[56] References Cited

U.S. PATENT DOCUMENTS

| | | | |
|---|---|---|---|
| 1,439,646 | 12/1922 | Smith | 264/317 |
| 2,226,382 | 12/1940 | Norrit | 204/11 |
| 3,379,812 | 4/1968 | Yakoron | 264/227 |
| 3,422,168 | 1/1969 | Bowser | 264/317 |
| 3,798,134 | 3/1974 | Hynet | 264/227 |
| 4,246,076 | 1/1981 | Gardner | 204/11 |
| 4,250,127 | 2/1981 | Warren et al. | 264/221 |
| 4,351,653 | 9/1982 | Becker et al. | |
| 4,422,905 | 12/1983 | Becker et al. | 204/11 |

FOREIGN PATENT DOCUMENTS 2933570 2/1982 Fed. Rep. of Germany .

OTHER PUBLICATIONS

Chemie Ingenieur Technik, vol. 39, 1967 (p. 4) (No Translation).

*Primary Examiner*—James Lowe
*Attorney, Agent, or Firm*—Sughrue, Mion, Zinn, Macpeak, and Seas

[57] ABSTRACT

Method for producing a separating nozzle element including a separating body and terminal plates, for the separation of a gaseous or vaporous mixture, wherein the separating body comprises separating structures which penetrate the separating body and define separating chambers and gas conduits, and the terminal plates are provided with channels for the intake and discharge of gas streams. A mold layer is produced which contains negative outlines of the separating structures. Thereafter, the negative outlines of the mold layer are filled with a structure material which is compatible with the gaseous or vaporous mixture to be separated to form the separating structures. The mold layer containing the negative outlines of the separating structure is produced by shaping the mold layer from a reusable tool provided with the positive outlines of the separating structures.

7 Claims, 3 Drawing Figures

METHOD FOR PRODUCING SEPARATING NOZZLE ELEMENTS

BACKGROUND OF THE INVENTION

The present invention relates to a method for producing a separating nozzle element comprising a separating body and terminal plates for the separation of gaseous or vaporous mixtures. Gaseous or vaporous mixtures are understood to mean, in particular, isotope mixtures, such as $^{235}UF_6$ and $^{238}UF_6$, which due to their chemical characteristics, make special demands on the material of the separating nozzle elements.

In a separating nozzle process, the gas pressure leading to the minimum specific energy consumption is inversely proportional to the characteristic dimensions of the separating structure, as disclosed in Chemie Ing. Technik, Volume 39 (1967) at page 4. Since the specific costs for compressors, pipelines, valves and control devices required for the implementation of the process decrease considerably with increasing gas pressure, it is desirable to make the separating nozzle structure as small as possible. the presently employed or desired inlet pressures between 0.5 and 1.5 bar correspond to a narrowest width between 10 and 3 microns for the deflector slit in the separating structure.

It is known to produce separating nozzles having particularly small characteristic dimensions and which are comprised of a separating body and terminal plates. The separating body is here penetrated by separating structures which define separating chambers and gas conduits, while the terminal plates include channels for the intake and discharge of the gas streams See German Pat. No. 2,933,570 and corresponding U.S. Pat. No. 4,351,653.

At the points where the separating structures are delimited by the terminal plates, there results by nature a deceleration of the gas stream decisive for the separation, resulting in a loss of separating output. This loss is the greater the smaller the ratio of thicknesss of separating body to narrowest width of the separator slit. This ratio is referred to herein as the "separating body aspect ratio". To keep separating output losses resulting from deceleration at the terminal plates as low as possible, separating body aspect ratios between 100 and 200 must be attained. Thus, with the narrowest width of 3 microns for the separating slit, the separating body should have a thickness between 300 and 600 microns.

Separating bodies having a narrowest width of a few microns for the separating slits can be produced with the required accuracy according to present-day knowledge by providing a plate of or a layer of a material whose characteristics can be changed by high-energy radiation. Negative molds containing the separating structure are formed from the material whose characteristics can be changed by high-energy radiation. The negative molds are formed by partial irradiation of the material, that is, by irradiating only selected portions of the material, followed by partial removal of material, to thereby utilize the different material properties generated by the irradiation. Depending on the nature of the material whose characteristics can be changed by irradiation, the material which is removed can be either the selected portions which have been irradiated, or can be the non-irradiated portions. In either case, the negative molds are then filled with a structure material which is compatible with the gaseous or vaporous mixture to be separated to thereby form the separating structures. The remaining material of the negative molds then is removed. In order to realize particularly high separating body aspect ratios, the process may be performed in stages, if required, as disclosed in German Pat. No. 2,933,570 and U.S. Pat. No. 4,351,653.

The separating nozzle elements produced in this manner, due to their extremely small characteristic dimensions and the relatively high gas pressure connected therewith, permit considerable savings in the above-mentioned system components. The costs for producing the separating nozzle elements themselves, however, are still relatively high compared to the costs of the other system components. Therefore, they may take up a considerable fraction of the total investment costs for an industrial separating nozzle system which lie in the order of magnitude of several billions of Deutsche Marks (approximately at least about 1 billion U.S. dollars). This problem of costs for the manufacture of separating nozzle elements is all the more difficult because the previously most successful use of the above-mentioned manufacturing principle utilizes so-called synchroton radiation, which makes the production dependent on the availability of an expensive electron accelerator.

SUMMARY OF THE INVENTION

It is an object of the present invention to simplify manufacture in a mass production system of separating nozzle elements wherein the technical and economic advantages connected with the small characteristic dimensions and the high separating body aspect ratio are fully utilized.

A further object of the present invention is to provide a method wherein such manufacture is substantially independent of the availability of expensive irradiation devices.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a method for producing a separating nozzle element including a separating body and terminal plates, for the separation of gaseous or vaporous mixtures, wherein the separating body comprises separating structures which penetrate the separating body and define separating chambers and gas conduits, and the terminal plates are provided with channels for the intake and discharge of gas streams, and wherein the separating structures are formed by producing a mold layer which contains negative outlines of the separating structures, and thereafter filling the negative outlines of the mold layer with a structure material which is compatible with the gaseous or vaporous mixture to be separated to form the separating structures, comprising producing the mold layer containing the negative outlines of the separating structure by shaping the mold layer from a reusable tool provided with the positive outlines of the separating structures.

Preferably, the mold layer is made from a material which is easily removed from the reusable tool.

The mold layer containing the negative outlines of the separating structures preferably is produced on a terminal plate of such design that a form-locking bond is established between the mold layer and the terminal plate.

It is further preferred that the material for the mold layer is a flowable plastic which changes to a rubber-elastic state.

The reusable tool containing the positive outlines of the separating structures preferably can be produced by filling a tool mold layer, containing the negative outlines of the separating structures on a base plate, with a material which is suitable for repeated copying and which can subsequently be removed from the tool mold layer, with the tool mold layer containing the negative outlines of the separating structures being produced by partial irradiation of a layer of material whose characteristics can be changed by radiation, followed by partial removal of the layer of material whose characteristics can be changed by radiation.

The material which is suitable for repeated copying and which can subsequently be removed from the tool mold layer preferably is a metal such as nickel or nickel chromium alloy which can be electrochemically deposited in the tool mold layer, for example, using the base plate as an electrode. The term "suitable for repeated copying" indicates that the material can be used repeatedly to produce mold layers which contain negative outlines of the separating structure. Depending on the nature of the material whose characteristics can be changed by irradiation, the material which is partially removed can be either selected portions which have been irradiated in the case where the irradiation increases the solubility of the material, or can be the non-irradiated portions in the case where the irradiation decreases the solubility of the material. The material whose characteristics can be changed by radiation can be PMMA (polymethylmethacrylate) or any other material described in German Pat. No. 2,933,570 and U.S. Pat. No. 4,351,653 as being one whose characteristics can be changed by radiation. Thus, the reusable tool can be produced by the irradiating technique and method described in German Pat. No. 2,933,570 and U.S. Pat. No. 4,351,653, which patents are hereby incorporated by reference.

The reusable tool containing the positive outlines of the separating structures preferably can be produced by copying a master tool.

It is to be understood that both the foregoing general description and the following detailed description are exemplary and explanatory, but are not restrictive of the invention.

BRIEF DESCRIPTION OF THE DRAWINGS

The accompanying drawings, in which like numbers indicate like parts, illustrate examples of presently preferred embodiments of the invention and, together with the description, serve to explain the principles of the invention.

Of the drawings.

DETAILED DESCRIPTION OF THE INVENTION

The present invention is based on the surprising realization that the extremely finely structured mold layer required for the manufacture of the separating body can be produced by shaping it from a reusable tool provided with the positive outline of the separating structure. The method according to the present invention not only considerably simplifies the manufacture of the separating nozzle elements and makes it less expensive, it also makes it substantially independent of the availability of expensive irradiation devices.

The most varied substances can be used as the material for the mold layer made from the reusable tool.

For example, a plastic can be used which can be easily separated from the reusable tool so that the extremely fine structures are not damaged when the reusable tool is removed from the mold layer.

It may here be of advantage for the mold layer containing the negative outlines of the separating structures to be produced on a terminal plate designed in such a manner that a form-locking bond is established between the mold layer and the terminal plate. In this way it is accomplished that the reusable tool can be separated relatively easily from the mold layer, while the mold layer remains firmly connected to the terminal plate. The shaping of the mold layer and the subsequent separation of the mold layer from the reusable tool is facilitated greatly if the mold layer is made from an initially flowable plastic e.g. silicone rubber which changes into a nonadhesive, rubber-elastic state.

In a preferred embodiment of the method according to the invention, a reusable tool is employed which is produced in a known manner by filling a lithographically produced mold, for example, by way of electrochemical metal deposition. See, for example, German Pat. No. 2,933,570 and U.S. Pat. No. 4,351,653.

Since mass production requires a large number of tools which wear out in time and must be replaced, it is advantageous, in order to further reduce manufacturing costs and to realize the greatest possible independence of costly irradiation devices, for these tools to be shaped from a master tool which has been produced by means of lithography and electrochemical deposition and which itself is not used for the mass production.

The manufacturing method according to the present invention will now be explained in greater detail with the aid of an embodiment and with drawing FIGS. 1 to 3.

For reasons of clarity, the separating structures penetrating the separating body and the channels for the intake and discharge of the gas streams in the terminal plates are shown schematically. An actual embodiment can be found, for example, in FIGS. 7 and 8 of German Pat. No. 2,933,570.

Figure 1:
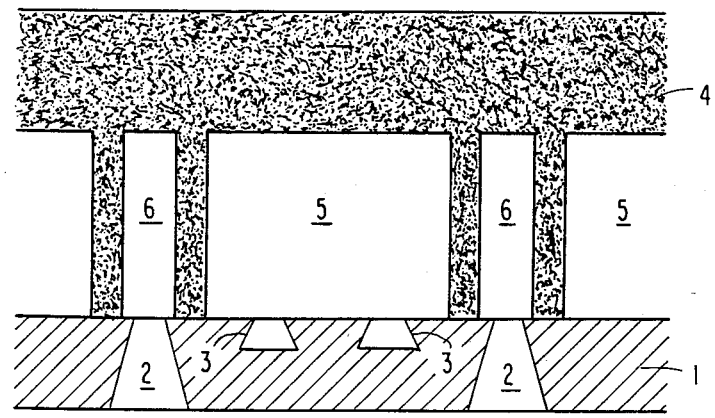
FIG. 1 is a schematic illustration of a reusable tool positioned on a terminal plate to produce a mold layer for forming the separating structure in accordance with the teachings of the present invention.
Figure 2:
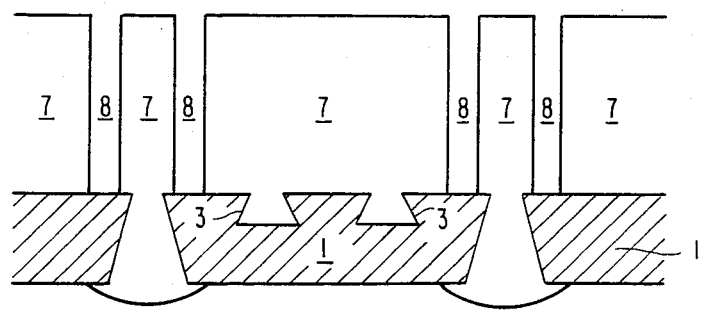
FIG. 2 is a schematic illustration showing the mold layer after removal of the reusable tool of FIG. 1.

From a terminal plate 1, provided with conical channels 2 for the conduction of gas and dovetail recesses 3, and from a nickel tool 4 which is provided with the positive outlines of the separating structures, which separating structures define gas conduits 5 and separating chambers 6, a mold is formed as shown in FIG. 1. The mold is evacuated and filled with liquid plastic in the form of a silicone rubber which changes into a nonadhering, rubber-elastic state to form a mold layer 7. The subsequent removal of tool 4 is possible without damage to the separating structures of tool 4, which in reality are extremely fine, due to the low adhesion and the rubber-elastic properties of the material of mold layer 7, so that the state shown in FIG. 2 results. Due to the conical design of the gas conducting channels 2 and the dovetail reccesses 3 in terminal plate 1, a firm bond is established between terminal plate 1 and mold layer 7 in spite of the poor adhesive forces in the rubber-elastic plastic of the mold layer 7. The empty spaces 8 in mold layer 7 then are filled to form separating structures 9 by way of the electrochemical deposition of nickel and utilization of terminal plate 1 as the electrode. Thereafter, the mold material 7 can be removed by means of a solvent. For removing PMMA acetone can be used as a solvent.

Figure 3:
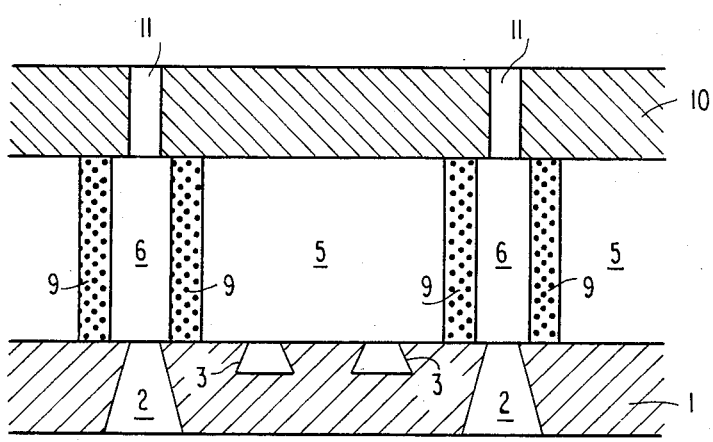
FIG. 3 is a schematic illustration showing a separating nozzle element produced in accordance with the present invention.

As shown in FIG. 3, a separating body is thus produced on terminal plate 1 and comprises separating structures 9 which define gas conduits 5 and separating chambers 6. This body is covered by a second terminal plate 10 which is equipped with gas conducting channels 11. This completes the manufacture of the separating nozzle element comprising the separating body and terminal plates 1 and 10.

It will be understood that the above description of the present invention is susceptible to various modifications, changes and adaptations, and the same are intended to be comprehended within the meaning and range of equivalents of the appended claims.

What is claimed is:

1. Method for producing a separating nozzle element including a separating body and terminal plates, for the separation of a gaseous or vaporous mixture, wherein the separating body comprises separating structures which penetrate the separating body and define separating chambers and gas conduits, and the terminal plates are provided with channels for the intake and discharge of gas streams, and wherein the separating structures are formed by producing a mold layer which contains negative outlines of the separating structures, and thereafter filling the negative outlines of the mold layer with a structure material which is compatible with the gaseous or vaporous mixture to be separated to form the separating structures, comprising: producing the mold layer containing the negative outlines of the separating structure by shaping the mold layer in a mold formed from the terminal plate and a reusable tool provided with the positive outlines of the separating structures, the mold being evacuated and then filled with liquid mold material to form the mold layer, the terminal plate being of such design that a form-locking band is established between the mold layer and terminal plate.

2. Method as defined in claim 1, wherein the mold layer is made from a material which is easily removed from the reusable tool.

3. Method as defined in claim 1, wherein the mold layer is made of a material which is a flowable plastic which changes to a rubber-elastic state.

4. Method as defined in claim 1, wherein the reusable tool containing the positive outlines of the separating structures is produced by filling a tool mold layer, containing the negative outlines of the separating structures on a base plate, with a material which is suitable for repeated copying and which can subsequently be removed from the tool mold layer, with the tool mold layer containing the negative outlines of the separating structures being produced by partial irradiation of a layer of material whose characteristics can be changed by radiation, followed by partial removal of the material whose characteristics can be changed by radiation.

5. Method as defined in claim 1, wherein the reusable tool containing the positive outlines of the separating structures is produced by copying a master tool.

6. Method as defined in claim 1, wherein the mold layer is made of a silicon rubber and the separating structures are metal.

7. Method as defined in claim 6, wherein the mold layer is dissolved after forming the separating structures.

* * * * *